US012793174B2

(12) United States Patent
Kim

(10) Patent No.: US 12,793,174 B2
(45) Date of Patent: Nov. 10, 2026

(54) ELECTRONIC DEVICE AND IMAGE PROCESSING METHOD THEREOF

(71) Applicant: SAMSUNG ELECTRONICS CO., LTD., Suwon-si (KR)

(72) Inventor: Ho Young Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 234 days.

(21) Appl. No.: 18/662,566

(22) Filed: May 13, 2024

(65) Prior Publication Data

US 2025/0173826 A1 May 29, 2025

(30) Foreign Application Priority Data

Nov. 28, 2023 (KR) ........................ 10-2023-0168299

(51) Int. Cl.
*G06T 3/4053* (2024.01)
*G06T 7/246* (2017.01)
*G06T 7/50* (2017.01)

(52) U.S. Cl.
CPC ............ *G06T 3/4053* (2013.01); *G06T 7/246* (2017.01); *G06T 7/50* (2017.01)

(58) Field of Classification Search
None
See application file for complete search history.

(56) References Cited

U.S. PATENT DOCUMENTS

| | | | | |
|---|---|---|---|---|
| 2023/0325977 | A1* | 10/2023 | Motilla | G06T 3/4046 382/299 |
| 2024/0095880 | A1* | 3/2024 | Liu | G06N 3/047 |
| 2024/0135507 | A1* | 4/2024 | Imber | G06T 3/4053 |
| 2024/0221113 | A1* | 7/2024 | Zhang | G06T 3/4046 |
| 2024/0265494 | A1* | 8/2024 | Rajasankar | G06T 3/4053 |

FOREIGN PATENT DOCUMENTS

| | | | | |
|---|---|---|---|---|
| GB | 2506172 A | * 3/2014 | | H04N 7/18 |
| GB | 2617220 A | * 10/2023 | | G06T 3/4023 |
| JP | 2009-296080 A | 12/2009 | | |
| JP | 2010-278898 A | 12/2010 | | |
| KR | 10-2019-0117416 A | 10/2019 | | |
| KR | 10-2103984 B1 | 4/2020 | | |
| KR | 10-2023-0101665 A | 7/2023 | | |
| KR | 10-2023-0115043 A | 8/2023 | | |

OTHER PUBLICATIONS

K. Fatahalian, "The Rise of Mobile Visual Computing Systems," in IEEE Pervasive Computing, vol. 15, No. 2, pp. 8-13, Apr.-Jun. 2016, doi: 10.1109/MPRV.2016.35. (Year: 2016).*

(Continued)

*Primary Examiner* — James A Thompson

(74) *Attorney, Agent, or Firm* — Sughrue Mion, PLLC

(57) ABSTRACT

An electronic device includes at least one main processor and a memory configured to store instructions, where the instructions, when executed by the at least one main processor, may cause the electronic device to determine, based on at least one parameter of a tile included in a rendered image, a super-resolution algorithm for the tile and process the tile based on the determined super-resolution algorithm.

15 Claims, 8 Drawing Sheets

800

(56) References Cited

OTHER PUBLICATIONS

"A Novel Real-Time DSP-Based Video Super-Resolution System", by Sebastian Lopez et al., IEEE Transactions on Consumer Electronics, vol. 55, No. 4, Nov. 2009, pp. 2264-2270. (Year: 2009).*

Lee et al., "SRNPU: an Energy-Efficient CNN-Based Super-Resolution Processor With Tile-Based Selective Super-Resolution in Mobile Devices", IEEE Journal on Emerging and Selected Topics in Circuits and Systems, Aug. 5, 2020, pp. 320-334, vol. 10, doi:10.1109/JETCAS.2020.3014454.

* cited by examiner

800

ELECTRONIC DEVICE AND IMAGE PROCESSING METHOD THEREOF

CROSS-REFERENCE TO RELATED APPLICATION

This application is based on and claims priority to Korean Patent Application No. 10-2023-0168299, filed on Nov. 28, 2023, in the Korean Intellectual Property Office, the disclosure of which is incorporated herein by reference in its entirety.

BACKGROUND

1. Field

The disclosure relates to an electronic device and an image processing method thereof.

2. Description of Related Art

Rendering (or image synthesis) may refer to the process of generating an image or a sequence of images from a model, a scene, and/or a description. For example, in an application such as a three-dimensional (3D) game, an electronic device (e.g., a video game console) may generate and output an image by performing rendering in response to user input. The process of increasing the resolution of an image (e.g., a rendered image) is referred to as super-resolution (or up-scaling). Power usage required for super-resolution may be high, and reducing the power usage may degrade the image quality that may be sensed by a user.

SUMMARY

Provided is a method of performing super-resolution based on information about image frames, tiles or primitives that reduces power usage required for super-resolution without degrading an image quality that may be sensed by a user.

Additional aspects will be set forth in part in the description which follows and, in part, will be apparent from the description, or may be learned by practice of the presented embodiments of the disclosure.

According to an aspect of the disclosure, an electronic device may include at least one main processor and a memory configured to store instructions, where the instructions, when executed by the at least one main processor, may cause the electronic device to determine, based on at least one parameter of a tile included in a rendered image, a super-resolution algorithm for the tile and process the tile based on the determined super-resolution algorithm.

The at least one parameter of the tile may include at least one of a motion vector of the tile, a depth of the tile, and a number of primitives included in the tile.

The super-resolution algorithm may be determined among one of a first super-resolution algorithm or a second super-resolution algorithm, based on the at least one parameter of the tile.

A power usage of the first super-resolution algorithm may be less than a power usage of the second super-resolution algorithm.

The instructions, when executed by the at least one main processor, may further cause the electronic device to determine the super-resolution algorithm by obtaining a value based on at least one of the motion vector of the tile and the depth of the tile, and selecting the first super-resolution algorithm based on the obtained value not satisfying a first threshold value, or selecting the second super-resolution algorithm based on the obtained value satisfying the first threshold value.

The electronic device may include a first auxiliary processor and a second auxiliary processor, and the instructions, when executed by the at least one main processor, may further cause the electronic device to perform the second super-resolution algorithm using both the first auxiliary processor and the second auxiliary processor based on at least one of the number of primitives included in the tile, the motion vector of the tile, and the depth of the tile satisfying a second threshold value.

The motion vector of the tile may be determined based on motion vectors of primitives included in the tile, and the depth of the tile may be determined based on depths of the primitives included in the tile.

According to an aspect of the disclosure, an electronic device may include at least one main processor, and a memory configured to store instructions, the instructions, when executed by the at least one main processor, may cause the electronic device to determine, based on at least one parameter of a rendered image, a super-resolution algorithm for the rendered image, and process the rendered image based on the determined super-resolution algorithm.

The at least one parameter of the rendered image may include at least one of a motion vector of the rendered image, a depth of the rendered image, and a number of primitives included in the rendered image.

The instructions, when executed by the at least one main processor, may further cause the electronic device to determine the super-resolution algorithm by obtaining a value based on at least one of the motion vector of the rendered image and the depth of the rendered image, and selecting a first super-resolution algorithm based on the obtained value not satisfying a first threshold value, or selecting a second super-resolution algorithm based on the obtained value satisfying the first threshold value.

A power usage of the first super-resolution algorithm may be less than a power usage of the second super-resolution algorithm.

The electronic device may include a first auxiliary processor and a second auxiliary processor, and the instructions, when executed by the at least one main processor, may further cause the electronic device to perform the second super-resolution algorithm using both the first auxiliary processor and the second auxiliary processor based on at least one of the number of primitives included in the rendered image, the motion vector of the rendered image, and the depth of the rendered image satisfying a second threshold value.

According to an aspect of the disclosure, an image processing method may include determining, based on at least one parameter of a tile included in a rendered image, a super-resolution algorithm for the tile, and processing the tile based on the determined super-resolution algorithm.

The at least one parameter may include at least one of a motion vector of the tile, a depth of the tile, and a number of primitives included in the tile.

The determining of the super-resolution algorithm may include selecting one of a first super-resolution algorithm or a second super-resolution algorithm based on the at least one parameter of the tile.

A power usage of the first super-resolution algorithm may be less than a power usage of the second super-resolution algorithm.

The selecting of the first super-resolution algorithm or the second super-resolution algorithm may include obtaining a value based on at least one of the motion vector of the tile and the depth of the tile and selecting the first super-resolution algorithm based on the obtained value not satisfying a first threshold value or selecting the second super-resolution algorithm based on the obtained value satisfying the first threshold value.

The method may include performing the second super-resolution algorithm using both a first auxiliary processor and a second auxiliary processor based on at least one of the number of primitives included in the tile, the motion vector of the tile, and the depth of the tile satisfying a second threshold value.

The motion vector of the tile may be determined based on motion vectors of primitives included in the tile, and the depth of the tile may be determined based on depths of the primitives included in the tile.

According to an aspect of the disclosure, a non-transitory computer-readable storage medium may store instructions that, when executed by at least one main processor, cause the at least one main processor to determine, based on at least one parameter of a tile included in a rendered image, a super-resolution algorithm for the tile, and process the tile based on the determined super-resolution algorithm.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1:
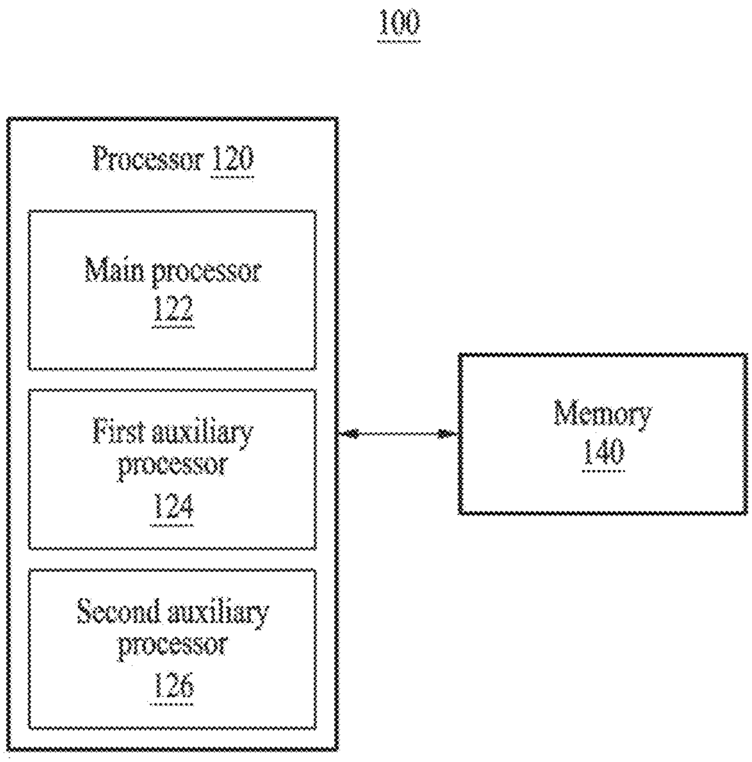
FIG. 1 is a block diagram illustrating an electronic device according to some embodiments.

Reference will now be made in detail to embodiments, examples of which are illustrated in the accompanying drawings, where like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments will be described in detail with reference to the accompanying drawings. The embodiments described below are merely exemplary, and various modifications are possible from these embodiments. In the following drawings, the same reference numerals refer to the same components, and the size of each component in the drawings may be exaggerated for clarity and convenience of description. Terms such as first, second, etc. may be used to describe various components, but are used only for the purpose of distinguishing one component from another component. These terms do not limit the difference in the material or structure of the components.

It should be noted that when one component is described as being "connected," "coupled," or "joined" to another component, the first component may be directly connected, coupled, or joined to the second component, or a third component may be "connected," "coupled," or "joined" between the first and second components.

In the following description, when a component is referred to as being "above" or "on" another component, it may be directly on an upper, lower, left, or right side of the other component while making contact with the other component or may be above an upper, lower, left, or right side of the other component without making contact with the other component.

The terms of a singular form may include plural forms unless otherwise specified. In addition, when a certain part "includes" a certain component, it means that other components may be further included rather than excluding other components unless otherwise stated. It will be further understood that the terms "comprises/comprising" and/or "includes/including," when used herein, specify the presence of stated features, integers, steps, operations, elements, and/or components, but do not preclude the presence or addition of one or more other features, integers, steps, operations, elements, components and/or groups thereof.

In addition, terms such as "unit" and "module" described in the specification may indicate a unit that processes at least one function or operation, and this may be implemented as hardware or software, or may be implemented as a combination of hardware and software.

The use of the term "the" and similar designating terms may correspond to both the singular and the plural.

Unless otherwise defined, terms used herein including technical and scientific terms may have the same meanings as those commonly understood by one of ordinary skill in the art to which this disclosure pertains. Terms such as those defined in commonly used dictionaries are to be interpreted as having a meaning that is consistent with their meaning in the context of the relevant art and are not to be interpreted in an idealized or overly formal sense unless expressly so defined herein.

Operations of a method may be performed in an appropriate order unless explicitly described in terms of order. In addition, the use of all illustrative terms (e.g., etc.) is merely for describing technical ideas in detail, and the scope is not limited by these examples or illustrative terms unless limited by the claims.

FIG. 1 is a block diagram illustrating an electronic device according to some embodiments.

Referring to FIG. 1, an electronic device 100 may process an image and/or a video (e.g., a sequence of images). The electronic device 100 may include a portable communication device (e.g., a smartphone), a computer device, a portable multimedia device, a camera, a wearable device, a home appliance device, etc.

The electronic device 100 may include a processor 120 and a memory 140. The processor 120 may control at least one other component (e.g., a hardware or software component) of the electronic device 100 by executing software (e.g., a program, instructions, etc.). The processor 120 may perform data processing or computations. The processor 120 may, as at least part of the data processing or computations, store instructions or data received from another component (e.g., a sensor module or a communication module) in the memory 140 and process the instructions or the data stored in the memory 140.

The processor 120 may include a main processor 122, one or more auxiliary processors (e.g., a first auxiliary processor 124 and a second auxiliary processor 126).

The one or more auxiliary processors (e.g., the first auxiliary processor 124 and the second auxiliary processor 126, which may be a graphics processing unit (GPU), a neural processing unit (NPU), a tensor processing unit (TPU), etc.) may operate in parallel with or independently of the main processor 122 (e.g., a central processing unit (CPU), an application processing unit (APU), etc.). For example, the one or more auxiliary processors (e.g., the first auxiliary processor 124 and the second auxiliary processor 126) may be configured to use less power than the main processor 122, or the one or more auxiliary processors (e.g., the first auxiliary processor 124 and the second auxiliary processor 126) may be configured to be configured to perform a specific function. The one or more auxiliary processors (e.g., the first auxiliary processor 124 and the second auxiliary processor 126) may be implemented separately from the main processor 122 or as part of the main processor 122.

The memory 140 may store data used by at least one component (e.g., the processor 120) of the electronic device 100. The data may include input data or output data for software (e.g., a program, instructions, etc.) and a command related to the software. The memory 140 may include a volatile memory or a non-volatile memory.

Figure 2:
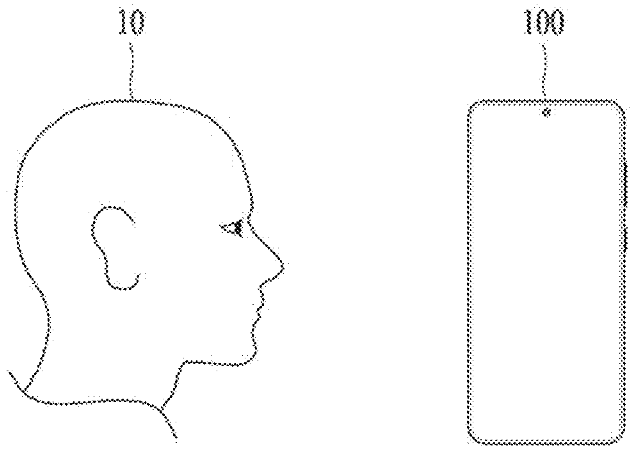
FIG. 2 is a diagram illustrating an environment to which a method is applied according to some embodiments.

FIG. 2 is a diagram illustrating an environment to which a method is applied according to some embodiments.

Referring to FIG. 2, the electronic device 100 may generate an image and/or video related to an application (e.g., a video game) through rendering.

In general, a user 10 may be able to view a stationary object more accurately than a moving object. Based on this human vision characteristic, the electronic device 100 may perform adaptive super-resolution. Through adaptive super-resolution, the electronic device 100 may reduce power usage required for super-resolution without image quality degradation that may be perceived by the user 10.

Figure 3:
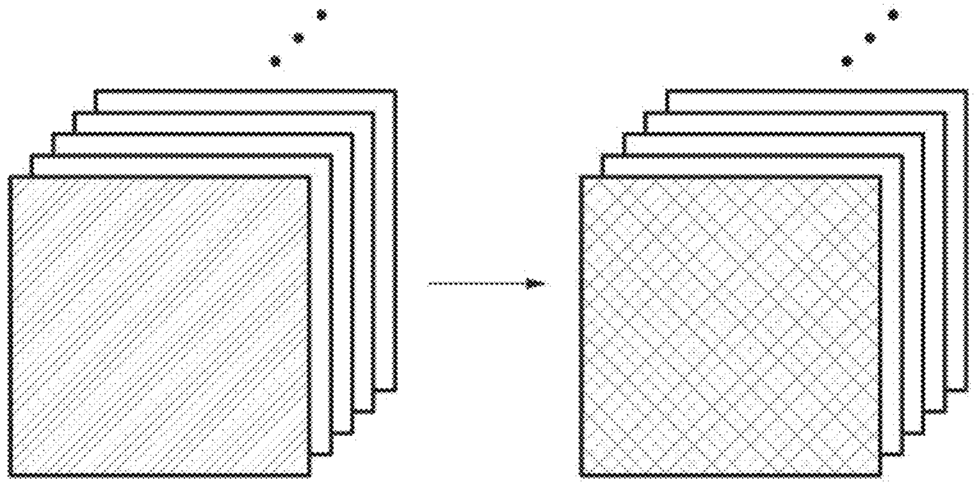
FIGS. 3, 4A and 4B are diagrams illustrating a method according to some embodiments.
Figure 4A:
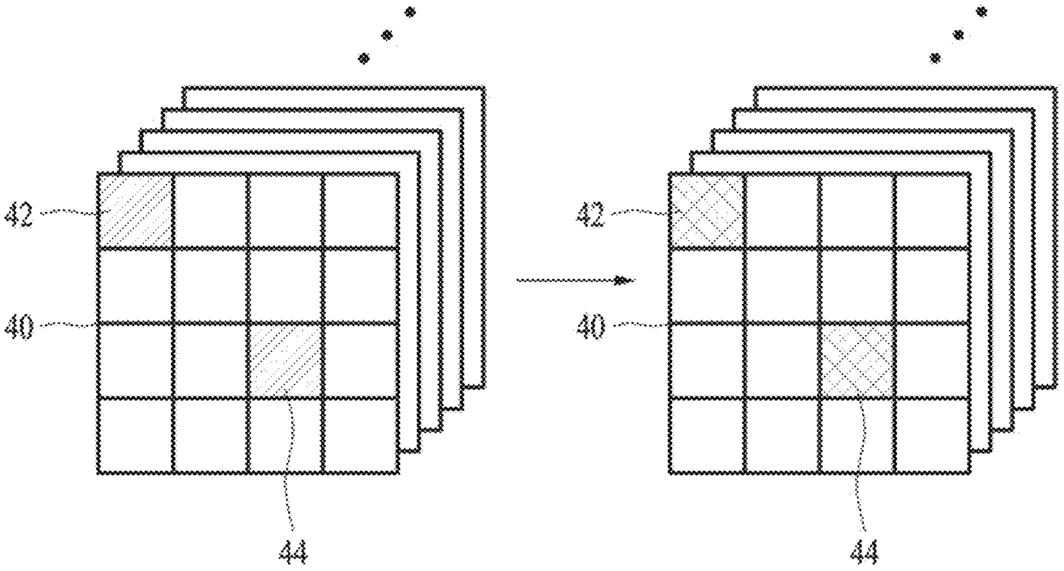
Figure 4B:
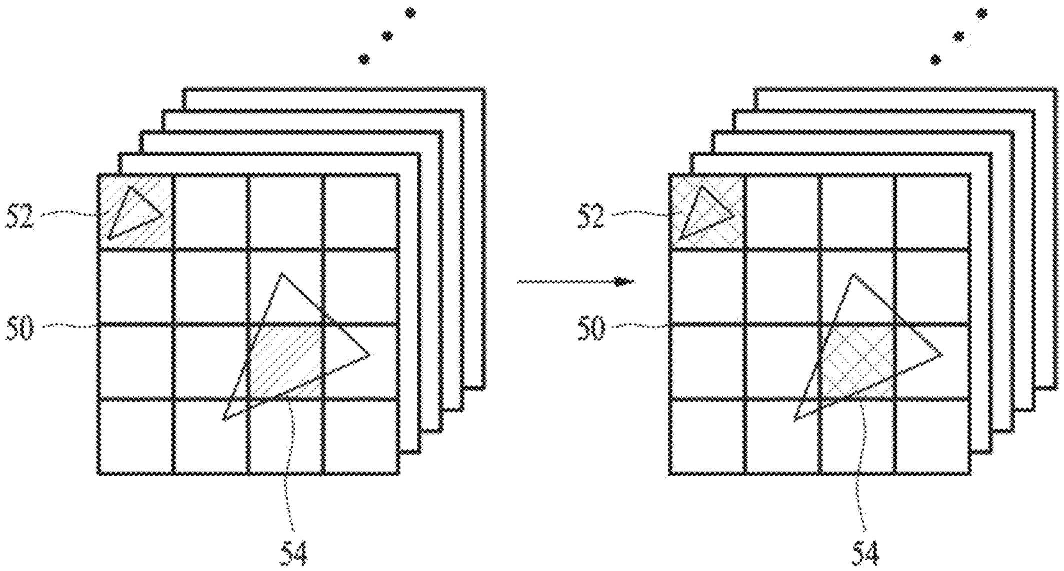

FIGS. 3, 4A and 4B are diagrams illustrating a method according to some embodiments. FIG. 3 is a diagram illustrating frame-based super-resolution, FIG. 4A is a diagram illustrating tile-based super-resolution, and FIG. 4B is a diagram illustrating primitive-based super-resolution.

Referring to FIG. 3, an electronic device (e.g., the electronic device 100 of FIGS. 1 and 2) may perform super-resolution based on image frames (e.g., frame-based super-resolution). For example, when there is little movement of an object (e.g., a building, a tree, etc.) included in an n-th (n is a natural number) image frame to an n+3-th image frame, the electronic device 100 may perform super-resolution of the n-th frame to n+3-th frame based on a high-performance super-resolution algorithm (e.g., deep learning-based super-resolution). In another example, when there are multiple movements of an object (e.g., a person) included in an n+4-th image frame to an n+7-th image frame, the electronic device 100 may perform super-resolution of the n+4-th image frame to the n+7-th image frame based on a low-power super-resolution algorithm (e.g., lightweight super-resolution). The electronic device 100 may perform super-resolution of a plurality of image frames in parallel (or simultaneously).

Referring to FIG. 4A, depths of tiles included in a rendered image frame 40 may differ from each other, and the electronic device 100 may perform super-resolution based on tiles in the rendered image frame 40 (e.g., tile-based super-resolution). For example, the electronic device 100 may perform super-resolution of a tile 42 (e.g., an n-th tile) based on a low-power super-resolution algorithm and may perform super-resolution of an n+10-th tile 44 based on a high-performance super-resolution algorithm. The number of tiles is only an example for description, and the scope of the present disclosure is not limited thereto. For example, the electronic device 100 may split the rendered image frame 40 into a plurality of tiles (e.g., 9, 16, 25) based on information about the rendered image frame 40 (e.g., the number of primitives included in the rendered image frame 40). The electronic device 100 may perform super-resolution of the plurality of tiles in parallel (or simultaneously).

Referring to FIG. 4B, the electronic device 100 may perform super-resolution based on primitives (e.g., a triangle) in the rendered image frame 50 (e.g., primitive-based super-resolution). As shown by example in FIG. 4B, one primitive 52 may be within one tile, and another primitive 54 may be across multiple tiles (i.e., a primitive included in the overall rendered image frame 50). For example, the electronic device 100 may perform super-resolution of an m-th (m is a natural number) primitive 52 based on a low-power super-resolution algorithm and may perform super-resolution of an m+1-th primitive 54 based on a high-performance super-resolution algorithm. The electronic device 100 may perform super-resolution of a plurality of primitives in parallel (or simultaneously).

Figure 5:
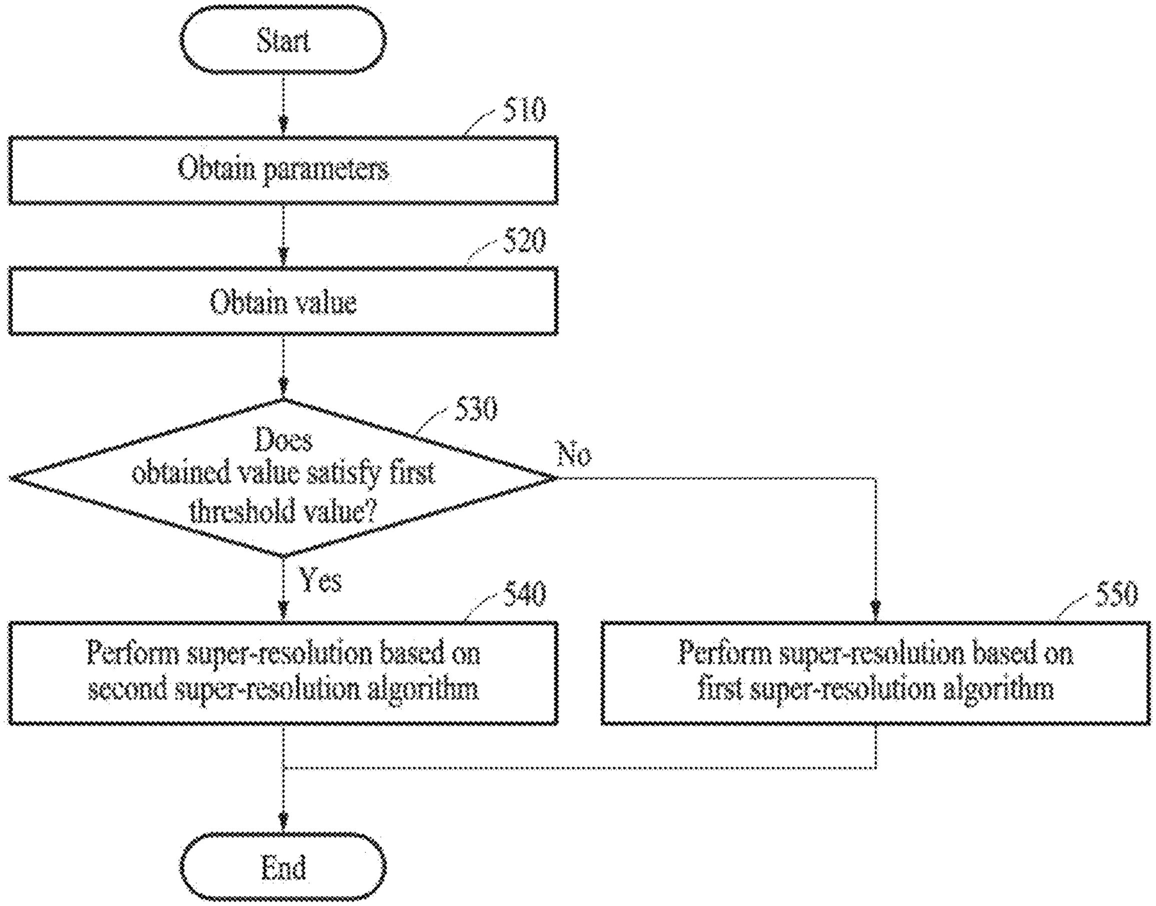
FIG. 5 is a flowchart illustrating a method according to some embodiments.

FIG. 5 is a flowchart illustrating a method according to some embodiments.

Referring to FIG. 5, operations 510 to 540 (or 550) may be sequentially performed. However, embodiments are not limited thereto. For example, two or more operations may be performed in parallel.

In operation 510, an electronic device (e.g., the electronic device 100 of FIGS. 1 and 2) may obtain parameters of a rendered image frame (e.g., the rendered image frames 40 and 50 of FIGS. 4A and 4B), parameters of a tile (e.g., the tile 42 and 44 of FIG. 4A) or a primitive (e.g., the primitive 52/54 of FIG. 4B) included in the rendered image. The parameters of the rendered image frame or the tile may include a motion vector of the rendered image frame or the tile, a depth of the rendered image frame or the tile, and the number of primitives included in the rendered image frame or the tile, etc. The parameters of the primitive may include a motion vector of the primitive and a depth of the primitive.

The electronic device 100 may perform rendering (e.g., low-resolution rendering) in order to generate the rendered image frame (e.g., a low-resolution image frame). The electronic device 100 may obtain, through rendering, motion vectors and depths of the primitives included in the rendered image frame.

The electronic device 100 may obtain a motion vector of the image frame by using the motion vectors of the primitives included in the image frame. For example, the electronic device 100 may determine a maximum value, a minimum value, or a median value among the motion vectors of the primitives included in the image frame to be the motion vector of the image frame. In another example, the electronic device 100 may determine an average value of the motion vectors of the primitives included in the image frame to be the motion vector of the image frame.

The electronic device 100 may obtain a depth of the image frame using the depths of the primitives included in the image frame. For example, the electronic device 100 may determine a maximum value, a minimum value, or a median value of the depths of the primitives included in the image frame to be the depth of the image frame. In another example, the electronic device 100 may determine an average value of the depths of the primitives included in the image frame to be the depth of the image frame.

The electronic device 100 may obtain the motion vector of the tile by using motion vectors of primitives included in the tile. For example, electronic device 100 may determine a maximum value, a minimum value, or a median value of the motion vectors of the primitives included in the tile to be the motion vector of the tile. In another example, the electronic device 100 may determine an average value of the motion vectors of the primitives included in the tile to be the motion vector of the tile.

The electronic device 100 may obtain the depth of the tile by using depths of the primitives included in the tile. For example, the electronic device 100 may determine a maximum value, a minimum value, or a median value of the depths of the primitives included in the tile to be the depth of the tile. In another example, the electronic device 100 may determine an average value of the depths of the primitives included in the tile to be the depth of the tile.

In operation 520, the electronic device 100 may obtain at least one specific value for the rendered image frame, the tile, or the primitive based on the obtained parameters (e.g., parameters obtained in operation 510). For example, the at least one specific value may be the parameters themselves obtained in operation 510. For another example, the electronic device 100 may obtain one specific value from the motion vector and the depth of the rendered image frame, the tile, or the primitive, using a predetermined function (e.g., average function). The one specific value may be smaller for smaller depths and/or smaller motion vector.

In operation 530, the electronic device 100 may determine whether the obtained value (e.g., the value obtained in operation 520) satisfies at least one corresponding first threshold value respectively. For example, the electronic device 100 may determine whether the parameters (e.g., depth and/or motion vector) obtained in operation 510 satisfy corresponding first thresholds (e.g., threshold depth and/or threshold motion vector size) respectively. For another example the electronic device 100 may determine whether the one specific value obtained by the predetermined function satisfies one first threshold value. The at least one first threshold value may be set by user.

In operation 540, in response to the obtained value (e.g., the value obtained in operation 520) satisfying the first threshold value, the electronic device 100 may perform super-resolution of the rendered image frame, the tile, or the primitive based on a second super-resolution algorithm (e.g., a high-performance super-resolution algorithm such as deep learning-based super-resolution). For example, the electronic device 100 may perform super-resolution based on the second super-resolution algorithm when the obtained value is less than the first threshold value.

In operation 550, in response to the obtained value not satisfying the first threshold value, the electronic device 100 may perform super-resolution of the rendered image frame, the tile, or the primitive based on a first super-resolution algorithm (e.g., a low-power super-resolution algorithm such as lightweight super-resolution). For example, the electronic device 100 may perform super-resolution based on the first super-resolution algorithm when the obtained value is greater than or equal to the first threshold value.

Figure 6:
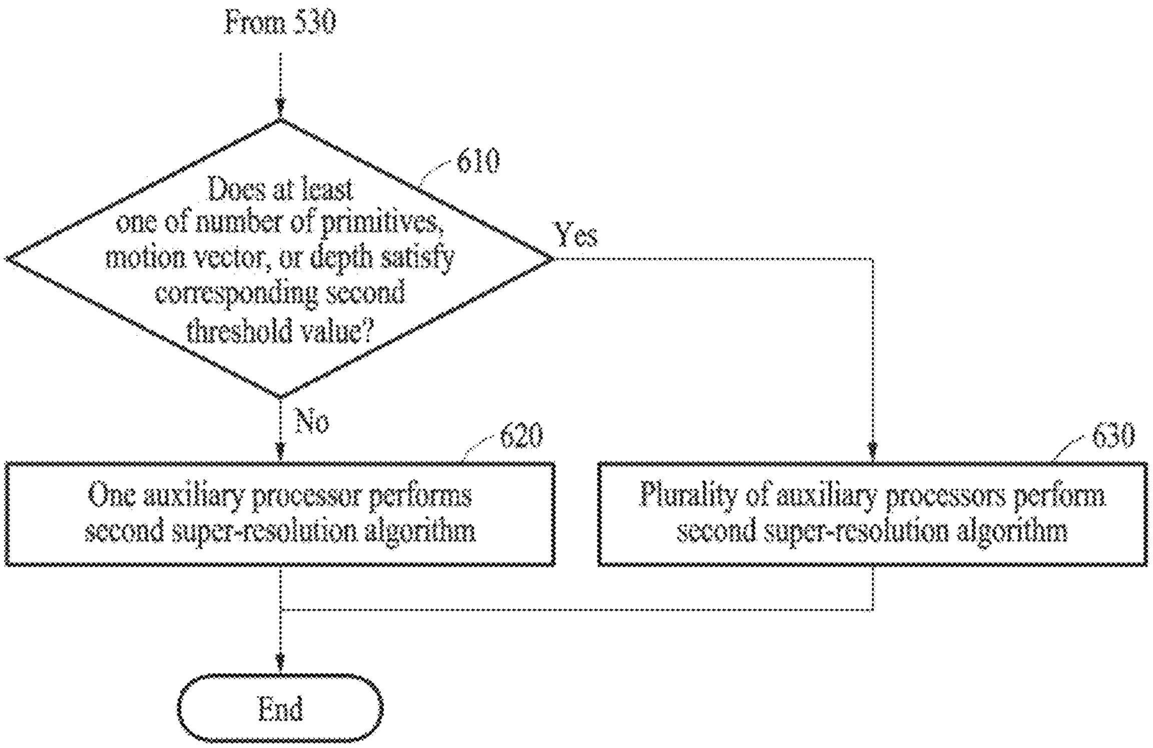
FIG. 6 is a flowchart illustrating a method according to some embodiments.

FIG. 6 is a flowchart illustrating a method according to some embodiments.

Referring to FIG. 6, a second super-resolution algorithm (e.g., a high-performance super-resolution algorithm such as deep learning-based super-resolution) may be performed by one or more auxiliary processors (e.g., the first auxiliary processor 124 and/or the second auxiliary processor 126 of FIG. 1). A main processor (e.g., the main processor 122 in FIG. 1) together with the one or more auxiliary processors (e.g., the first auxiliary processor 124 and the second auxiliary processor 126) may perform operations required for super-resolution. Operations 610 and 620 (or 630) may be sequentially performed. However, embodiments are not limited thereto. For example, operations 610 and 620 (or 630) may be performed in parallel.

In operation 610, an electronic device (e.g., the electronic device 100 of FIGS. 1 and 2) may determine whether at least one of the number of primitives, a motion vector, and a depth satisfies a corresponding second threshold value (e.g., threshold number of primitives, threshold depth, and/or threshold motion vector size). For example, when the electronic device 100 performs frame-based super-resolution or tile-based super-resolution, the electronic device 100 may determine whether at least one of the number of primitives included in a rendered image frame or a tile, a motion vector of the rendered image frame or the tile, and a depth of the rendered image frame or the tile satisfies the corresponding second threshold value. In another example, when the electronic device 100 performs primitive-based super-resolution, the electronic device 100 may determine whether at least one of the motion vector and the depth of a primitive satisfies the corresponding second threshold value. The second threshold value may be set by user.

In operation 620, in response to the number of the primitives, the motion vector, and the depth not satisfying the corresponding second threshold value (e.g., when the number of the primitives is less than or equal to the second threshold value), the second super-resolution algorithm may be performed by a predetermined number of or less auxiliary processors. For example, the second super-resolution algorithm may be performed by a single auxiliary processor (e.g., the first auxiliary processor 124 of FIG. 1, such as a GPU, or the second auxiliary processor 126 of FIG. 1, such as an NPU).

In operation 630, in response to at least one of the number of the primitives, the motion vector, and the depth satisfying the second threshold value (e.g., when the number of the primitives is greater than the second threshold value), the second super-resolution algorithm may be performed by a predetermined number of or more auxiliary processors. For example, the second super-resolution algorithm may be performed by the first auxiliary processor 124 and the second auxiliary processor 126.

As a super-resolution operation is performed using a varying number of auxiliary processors, power efficiency of the electronic device 100 may be improved.

Figure 7:
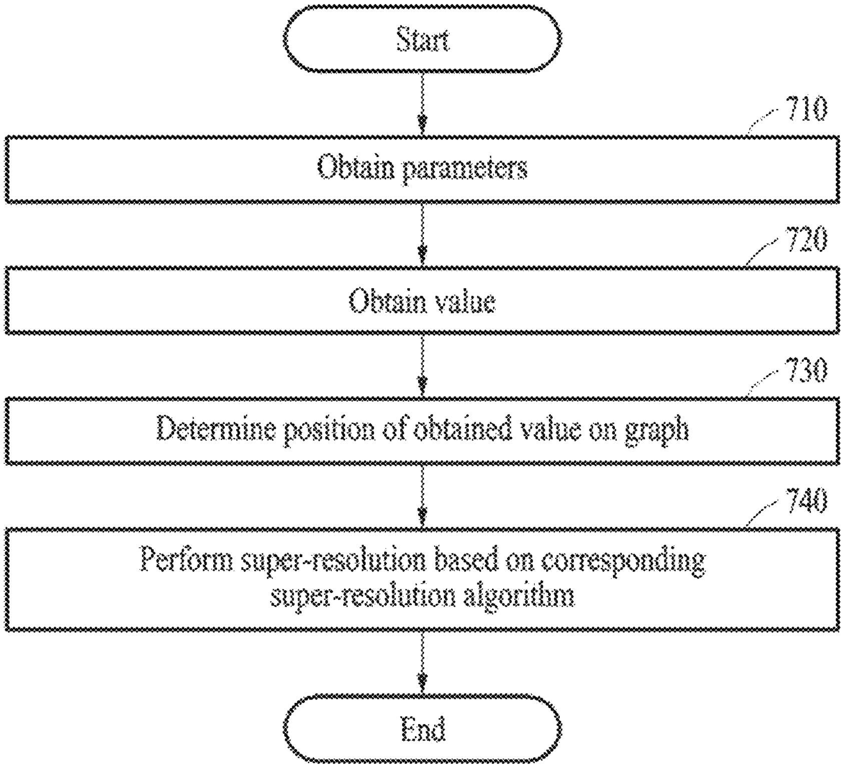
FIG. 7 is a flowchart illustrating a method according to some embodiments.
Figure 8:
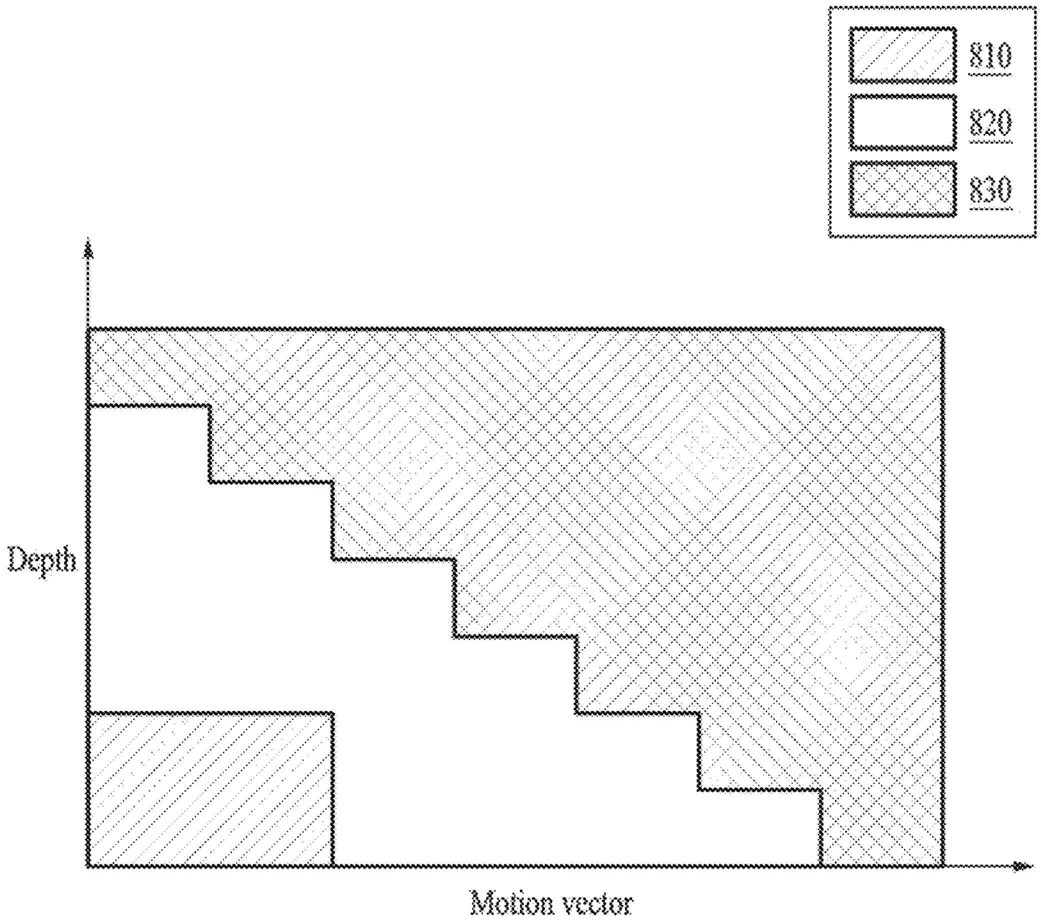
FIG. 8 is a graph illustrating a super-resolution process, according to some embodiments.

FIG. 7 is a flowchart illustrating a method according to some embodiments. FIG. 8 is a graph illustrating a super-resolution process, according to some embodiments.

Referring to FIGS. 7 and 8, an electronic device (e.g., the electronic device 100 of FIGS. 1 and 2) may use a graph 800 to perform super-resolution. Operations 710 to 740 may be sequentially performed, but embodiments are not limited thereto. For example, two or more operations may be performed in parallel.

In operation 710, the electronic device 100 may obtain parameters of a rendered image frame, a tile, or a primitive. The parameters may include a motion vector and a depth of the rendered image frame, the tile, or the primitive. Operation 710 may be substantially identical to operation 510. Thus, a repeated description thereof is omitted.

In operation 720, the electronic device 100 may obtain a specific value based on the obtained parameters. For example, the electronic device 100 may obtain the specific value from the motion vector and the depth of the rendered image frame, the tile, or the primitive, using a predetermined function.

In operation 730, the electronic device 100 may determine a position of the obtained value (e.g., the value obtained in operation 720) on the graph 800. The graph 800 of FIG. 8 is only an example for description, and embodiments are not limited thereto. For example, shapes of areas (e.g., a first area 810, a second area 820, and a third area 830) of the graph 800 may be variously set. As shown in FIG. 8, the value determined in operation 720 may be a function of the motion vector and the depth of the rendered image frame, the tile, and/or the primitive.

In operation 740, the electronic device 100 may select a super-resolution algorithm based on the position of the obtained value on the graph 800. The electronic device 100 may perform super-resolution of the rendered image frame, the tile, or the primitive, based on the selected super-resolution algorithm. For example, when the obtained value is located within the first area 810 (i.e., when the value obtained in operation 720 indicates that the motion vector and/or the depth are relatively low or are less than a first motion vector/first depth threshold), the electronic device 100 may perform super-resolution using a plurality of auxiliary processors (e.g., the first auxiliary processor 124 and the second auxiliary processor 126 of FIG. 1) based on a second super-resolution algorithm (e.g., a high-performance super-resolution algorithm such as deep learning-based super-resolution). When the obtained value is located in the second area 820 (i.e., when the value obtained in operation 720 indicates that the motion vector and/or the depth are relatively medium or exceed a first motion vector/first depth threshold and are less than a second motion vector/second depth threshold), the electronic device 100 may perform super-resolution using one auxiliary processor (e.g., the first auxiliary processor 124 or the second auxiliary processor 126) based on the second super-resolution algorithm. When the obtained value is located within the third area 830 (i.e., when the value obtained in operation 720 indicates that the motion vector and/or the depth exceed the second motion vector/second depth threshold), the electronic device 100 may perform super-resolution using one or more auxiliary processors (e.g., the first auxiliary processor 124 and/or the second auxiliary processor 126) based on a first super-resolution algorithm (e.g., a low-power super-resolution algorithm such as lightweight super-resolution).

Figure 9:
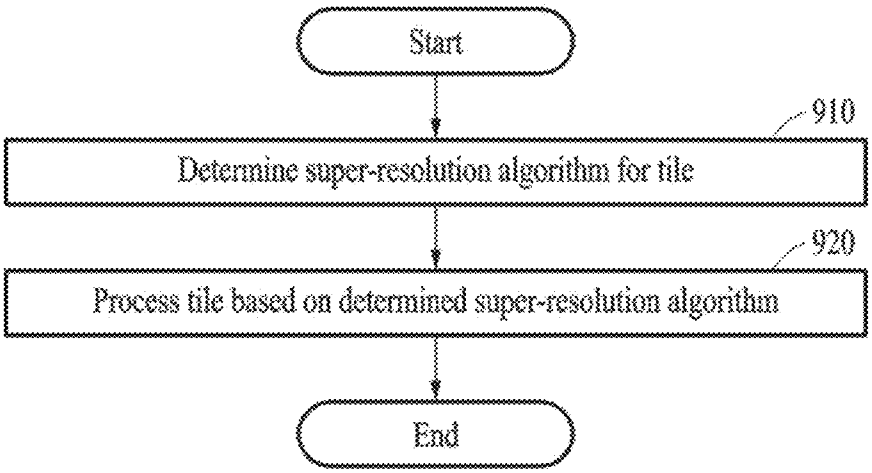
FIG. 9 is a flowchart illustrating an operating method of an electronic device, according to some embodiments.

FIG. 9 is a flowchart illustrating an operating method of an electronic device, according to some embodiments.

Referring to FIG. 9, an electronic device (e.g., the electronic device 100 of FIGS. 1 and 2) may perform tile-based super-resolution. Operations 910 and 920 may be substantially identical to the operations of the electronic device 100 described above with reference to FIGS. 1 to 8. Thus, a repeated description thereof may be omitted.

In operation 910, the electronic device 100 may determine, based on a parameter of a tile included in a rendered image frame, a super-resolution algorithm for the tile.

In operation 920, the electronic device 100 may process the tile based on the determined super-resolution algorithm.

Figure 10:
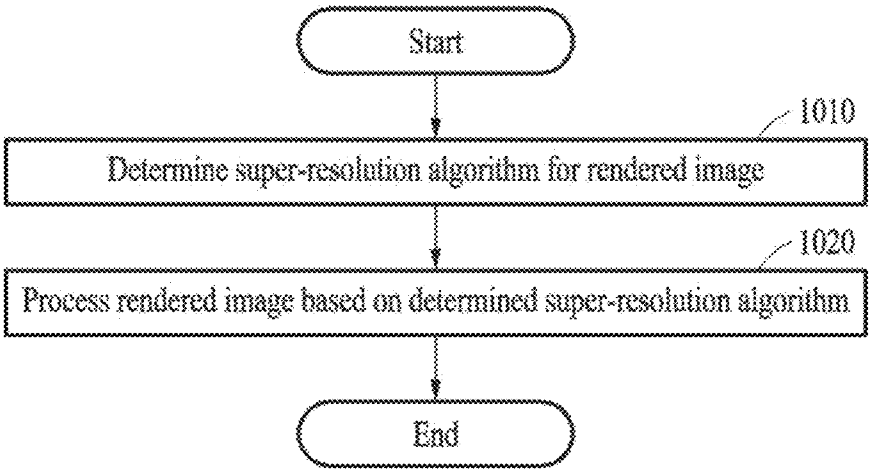
FIG. 10 is a flowchart illustrating an operating method of an electronic device, according to some embodiments.

FIG. 10 is a flowchart illustrating an operating method of an electronic device, according to an embodiment.

Referring to FIG. 10, an electronic device (e.g., the electronic device 100 of FIGS. 1 and 2) may perform frame-based super-resolution. Operations 1010 and 1020 may be substantially identical to the operations of the electronic device 100 described above with reference to FIGS. 1 to 8. Thus, a repeated description thereof is omitted.

In operation 1010, the electronic device 100 may determine, based on a parameter of a rendered image frame, a super-resolution algorithm for the rendered image frame.

In operation 1020, the electronic device 100 may process the rendered image frame based on the determined super-resolution algorithm.

The examples described herein may be implemented using hardware components, software components, and/or combinations thereof. A processing device may be implemented using one or more general-purpose or special-purpose computers, such as, for example, a processor, a controller, an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is used as singular. However, one of ordinary skill in the art will appreciate that a processing device may include multiple processing elements and/or multiple types of processing elements. For example, a processing device may include a plurality of processors, or a single processor and a single controller. In addition, a different processing configuration is possible, such as one including parallel processors.

The software may include a computer program, a piece of code, an instruction, or some combination thereof, to independently or collectively instruct or configure the processing device to operate as desired. The software and/or data may be stored in any type of machine, component, physical or virtual equipment, or computer storage medium or device for the purpose of being interpreted by the processing device or providing instructions or data to the processing device. The software may also be distributed over network-coupled computer systems so that the software is stored and executed in a distributed fashion. The software and data may be stored in a non-transitory computer-readable recording medium.

The methods according to the above-described examples may be recorded in non-transitory computer-readable media including program instructions to implement various operations of the above-described examples. The media may also include the program instructions, data files, data structures, and the like alone or in combination. The program instructions recorded on the media may be those specially designed and constructed for the examples, or they may be of the kind well-known and available to those having skill in the computer software arts. Examples of non-transitory computer-readable media include magnetic media such as hard disks, floppy disks, and magnetic tape; optical media such as compact disc read-only memory (CD-ROM) and a digital versatile disc (DVD); magneto-optical media such as floptical disks; and hardware devices that are specially configured to store and perform program instructions, such as read-only memory (ROM), random-access memory (RAM), flash memory, and the like. Examples of program instructions include both machine code, such as those produced by a compiler, and files containing higher-level code that may be executed by the computer using an interpreter.

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., CD-ROM), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

At least one of the devices, units, components, modules, units, or the like represented by a block or an equivalent indication in the above embodiments including, but not limited to, FIG. 1, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An electronic device comprising:
at least one main processor;
a first auxiliary processor and a second auxiliary processor; and
a memory configured to store instructions,
wherein the instructions, when executed by the at least one main processor, cause the electronic device to:
determine, based on at least one parameter of a tile included in a rendered image, one of a first super-resolution algorithm or a second super-resolution algorithm as a super-resolution algorithm for the tile; and
process the tile based on the determined super-resolution algorithm,
wherein the instructions, when executed by the at least one main processor, further cause the electronic device to, based on the determined super-resolution algorithm being the second super-resolution algorithm, determine whether to use one or both of the first auxiliary processor and the second auxiliary processor based on the at least one parameter of the tile, and
wherein the at least one parameter of the tile comprises at least one of a motion vector of the tile, a depth of the tile, and a number of primitives included in the tile.

2. The electronic device of claim 1, wherein a power usage of the first super-resolution algorithm is less than a power usage of the second super-resolution algorithm.

3. The electronic device of claim 1, wherein the instructions, when executed by the at least one main processor, further cause the electronic device to determine the super-resolution algorithm by:
obtaining a value based on at least one of the motion vector of the tile and the depth of the tile; and
selecting the first super-resolution algorithm based on the obtained value not satisfying a first threshold value; or
selecting the second super-resolution algorithm based on the obtained value satisfying the first threshold value.

4. The electronic device of claim 3,
wherein the instructions, when executed by the at least one main processor, further cause the electronic device to perform the second super-resolution algorithm using both the first auxiliary processor and the second auxiliary processor based on at least one of the number of primitives included in the tile, the motion vector of the tile, and the depth of the tile satisfying a second threshold value.

5. The electronic device of claim 1, wherein the motion vector of the tile is determined based on motion vectors of primitives included in the tile, and wherein the depth of the tile is determined based on depths of the primitives included in the tile.

6. An electronic device comprising:

at least one main processor;

a first auxiliary processor and a second auxiliary processor; and a memory configured to store instructions, wherein the instructions, when executed by the at least one main processor, cause the electronic device to:

determine, based on at least one parameter of a rendered image, one of a first super-resolution algorithm or a second super-resolution algorithm as a super-resolution algorithm for the rendered image; and process the rendered image based on the determined super-resolution algorithm, wherein the instructions, when executed by the at least one main processor, further cause the electronic device to, based on the determined super-resolution algorithm being the second super-resolution algorithm, determine whether to use one or both of the first auxiliary processor and the second auxiliary processor based on the at least one parameter of the rendered image, and wherein the at least one parameter of the rendered image comprises at least one of a motion vector of the rendered image, a depth of the rendered image, and a number of primitives included in the rendered image.

7. The electronic device of claim 6, wherein the instructions, when executed by the at least one main processor, further cause the electronic device to determine the super-resolution algorithm by:

obtaining a value based on at least one of the motion vector of the rendered image and the depth of the rendered image; and selecting the first super-resolution algorithm based on the obtained value not satisfying a first threshold value; or selecting the second super-resolution algorithm based on the obtained value satisfying the first threshold value.

8. The electronic device of claim 7, wherein a power usage of the first super-resolution algorithm is less than a power usage of the second super-resolution algorithm.

9. The electronic device of claim 7, wherein the instructions, when executed by the at least one main processor, further cause the electronic device to perform the second super-resolution algorithm using both the first auxiliary processor and the second auxiliary processor based on at least one of the number of primitives included in the rendered image, the motion vector of the rendered image, and the depth of the rendered image satisfying a second threshold value.

10. An image processing method comprising:

determining, based on at least one parameter of a tile included in a rendered image, one of a first super-resolution algorithm or a second super-resolution algorithm as a super-resolution algorithm for the tile;

based on the determined super-resolution algorithm being the second super-resolution algorithm, determining whether to use one or both of a first auxiliary processor and a second auxiliary processor based on the at least one parameter of the tile; and processing the tile based on the determined super-resolution algorithm, wherein the at least one parameter comprises at least one of a motion vector of the tile, a depth of the tile, and a number of primitives included in the tile.

11. The method of claim 10, wherein a power usage of the first super-resolution algorithm is less than a power usage of the second super-resolution algorithm.

12. The method of claim 10, wherein the selecting of the first super-resolution algorithm or the second super-resolution algorithm comprises:

obtaining a value based on at least one of the motion vector of the tile and the depth of the tile; and selecting the first super-resolution algorithm based on the obtained value not satisfying a first threshold value; or selecting the second super-resolution algorithm based on the obtained value satisfying the first threshold value.

13. The method of claim 10, further comprising performing the second super-resolution algorithm using both the first auxiliary processor and the second auxiliary processor based on at least one of the number of primitives included in the tile, the motion vector of the tile, and the depth of the tile satisfying a second threshold value.

14. The method of claim 10, wherein the motion vector of the tile is determined based on motion vectors of primitives included in the tile, and wherein the depth of the tile is determined based on depths of the primitives included in the tile.

15. A non-transitory computer-readable storage medium storing instructions that, when executed by at least one main processor, cause the at least one main processor to perform the method of claim 10.

* * * * *